Aug. 17, 1965   W. McCOLL   3,200,833
VALVE HEATING MEANS
Filed Dec. 22, 1961
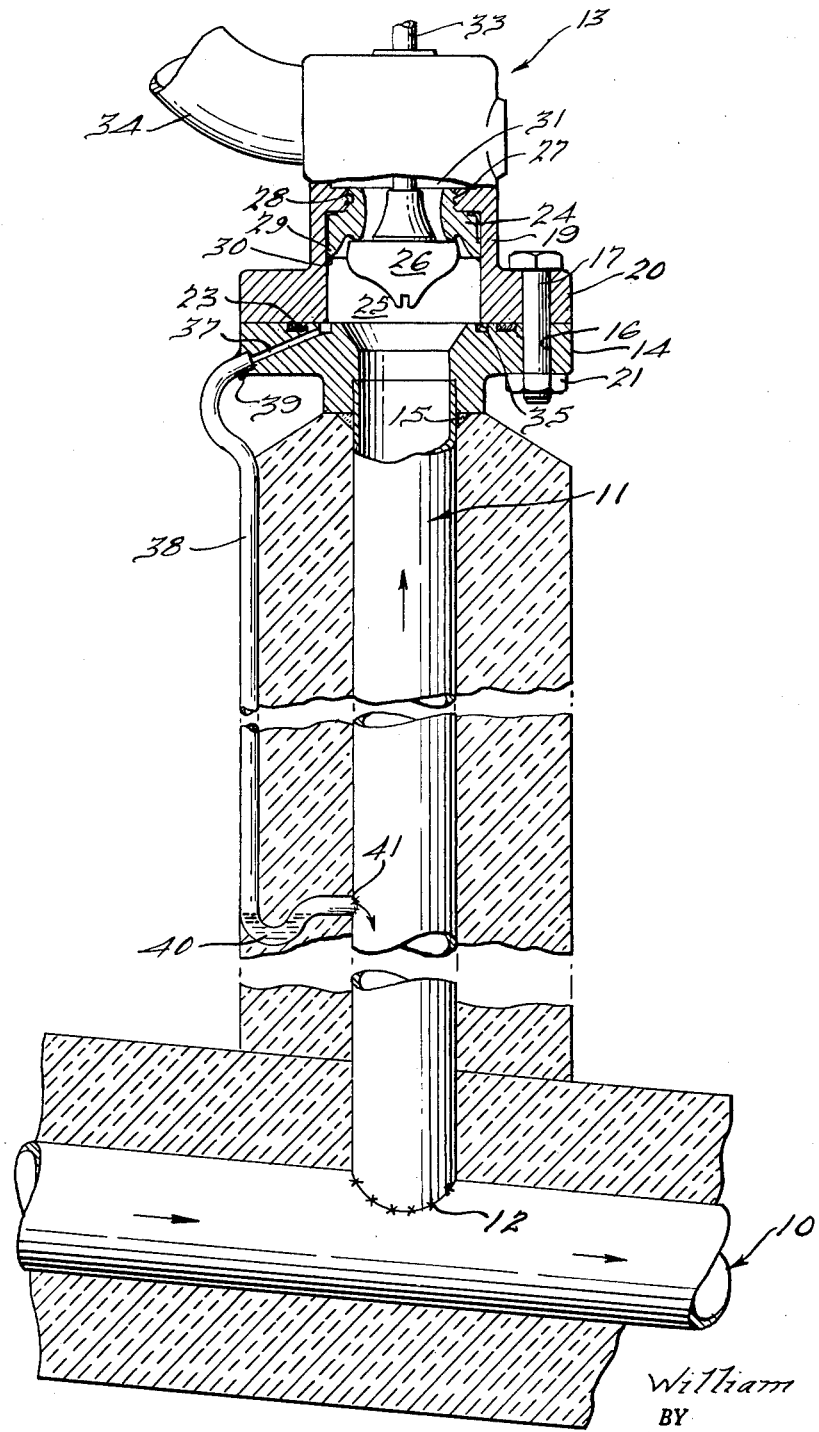
INVENTOR.
William McColl
BY
Harness, Dickey & Pierce
ATTORNEYS

3,200,833
VALVE HEATING MEANS
William McColl, Southampton, England, assignor to Diamond Power Specialty Corporation, Lancaster, Ohio
Filed Dec. 22, 1961, Ser. No. 161,694
4 Claims. (Cl. 137—154)

This invention relates to valving and conductor means for steam supply systems, and is particularly concerned with means for supplying steam to soot blowers. The blow valves of soot blowers are commonly of a poppet type which has been found to be highly reliable, and the present invention is adapted for incorporation in and for operation in conjunction with valves of this type.

The requirements for soot blowing in boiler installations are such that the valves are only opened periodically, for example, three times a day in some installations, for relatively short periods of time to pass steam to the soot blowers. During the long inactive periods of the soot blowing system, the main steam header and the branch lines connected thereto for supplying the individual blow valves are not charged with steam and the steam supply system including the valves cools down. When the header and branch lines are then charged with steam according to the blowing schedule, the valves and portions of the steam lines are subjected to a considerable thermal shock. The seat members and discs of the valves and also the inner portions of the header and branch lines rapidly heat up, but the exterior portions of the valve bodies and branch lines such as the connecting flanges thereof are not so rapidly heated by the steam and do not expand at the same rate or to the same degree as do the valve seat members and other portions of the valve bodies. It is noted that extensive radiation of heat from the exterior portions of the relatively massive body also contributes to its slow rate of heating. These differences in expansion, and particularly when coupled with the irregular shape of the valve bodies result in warping of the bodies and in the transmission of warping forces to the seat members which become deformed and result in improper seating of the valve discs thereon. Repeated differential expansions and deformations of this nature may result in permanent and extensive deformations of the seat members and cause serious disc and seat face erosion and steam leaks. It is noted that these deformations of the seat members often result in cracking of the hard seat faces.

When the blow valves are then opened, after a short warmup period usually of a few minutes, a second thermal shock occurs due to the rapid heating of the inside of the downstream portions of the valve bodies and seat members. This second thermal shock is not as instrumental as the first shock in warping the valve bodies and seat members but is a contributing factor.

The steam leaks resulting from the valve seat deformation may cause damage throughout the soot blowing apparatus and the boiler installation. For example, when the soot blower is in its retracted position during the warmup period, steam leaking past the blow valve may damage the boiler housing. Moreover, the leaking steam will tend to condense in the blowing apparatus and when the blow valve is opened, the condensate will impinge with damaging force upon the boiler tubes. It is noted that in most boiler installations drainage valves are provided on the steam lines to drain off condensate which forms therein during the warmup period. Also, water in the system tends to deteriorate the valve stem and blowing apparatus packing which is designed for steam and not water. Further, water injected into the boiler will cause adherence of dust and other insulation-like substances to the tubes, particularly in the lower temperature portions of the boiler. In these portions, the water will also tend to react with certain gases such as sulfur dioxide and trioxide to form acids deleterious to the tubes. These gases are normally present in the combustion by-products of furnace fuels whether they be gas, oil, or coal.

Needless to say, the repair or replacement of these blow valve seats is very tedious, time consuming, and expensive. Moreover, in certain installations it is not convenient to take any one of the blow valves out of operation for the time required to make repairs thereon.

A principal object of the invention therefore is to provide an improved means for reducing the heat distortion of portions of the blow valves of soot blowing systems normally resulting from excessively different heating rates of the various portions of the valves.

Another object is to provide a device of this type with warmup means for bringing steam into closer contact with the more massive portions of the blow valve during the warmup period prior to blowing to increase the heating and expansion rates of these portions which heretofore were heated and expanded at substantially lower rates than other portions thereof and particularly the seat member.

Another object is to reduce the amount of condensate normally formed by the relatively cool steam lines and blow valves.

A further object is to greatly increase the life of blow valve seats by providing valve warmup means for reducing the thermal shocks to which the blow valves are subjected when the main steam header is energized and when the valves are opened.

In a broad sense, the attainment of these objects by the present invention resides in the provision of a heating passage adjacent inner portions of the valve body and branch line flanges, through which steam is conveyed into contact with these inner portions, and further by the provision of a condensing tube which communicates with the heating passage to receive steam which has passed thereinto and condense the same to provide a pressure drop tending to draw steam into the heating passage. The condensing tube is not insulated so that it is cool compared to the steam and extends downwardly from the heating passage along the exterior portions of the insulated steam supply piping. The condensing tube may connect back into the steam lines, or as with any condenser, it may be constructed to discharge its condensate outside of the steam lines into a suitable receptacle.

Further objects, advantages and novel features of the present invention will become apparent from the following description taken in conjunction with the claims and drawing in which:

The single figure is a partial cross sectional view of a portion of a soot blowing system embodying applicant's improved warmup arrangement.

Referring to the drawing, a main steam header 10 is welded to a branch steam supply line 11 at 12 and is adapted to supply steam to the soot blowing valve 13 of a soot blower for a water tube boiler or the like. Any number of branch lines may be secured to steam main 10 depending on the number of soot blowers needed. The steam main 10 and branch line 11 are surrounded with conventional insulation material such as asbestos lagging. A connecting flange 14 is secured to the top of line 11 by welding at 15 and is provided with a plurality of apertures 16 for receiving flange bolts 17.

The blow valve 13 which is opened to pass steam to the soot blower when required and the steam lines are provided with improved means for increasing the warmup rate of certain critical parts thereof to reduce warping. The valve body 19 which is usually of cast steel is provided with an integral mounting flange 20 secured to line flange 14 by flange bolts 17 and nuts 21. An annular and conventional chevron-type laminated metal and asbestos gasket 23 nested in an annular recess in flange 14 is tightly clamped by bolts 17 between the flanges to provide a steam seal. The flanges 14 and 20 tightly engage each other along portions lying radially inwardly and outwardly of the gasket 23 and heat from flange 14 will be readily transmitted to flange 20. A copper or other heat conductive gasket (not shown) may be employed and clamped between flanges 14 and 20 to enhance the steam seal while allowing good heat transfer between the flanges.

The cylindrical inlet cavity 25 of the valve accommodates the cast steel valve seat member 24 and disc 26 which may also be of cast steel. Seat member 24 may be provided with a hard seating face such as Stellite. Disc 26 is mounted to reciprocate vertically in cavity 25 and open against the steam pressure and the force of its closing spring, not shown. A cylindrical portion of seat member 24 is threaded at 27 into a threaded portion 28 of the valve body and an end portion 29 of member 24 is secured as for instance by welding at 30 to the wall of cavity 25. It is noted that either the threads at 27 alone or the weld at 30 alone may be used if desired to secure the seat member into the valve body. The disc 26 is secured to a stem 33 which projects slidably through and above the top of the body 19 in the conventional manner for actuation to move the disc relative to seat 24 to permit or interrupt the passage of steam. An outlet chamber 31 formed in the body may, as shown, communicate with an outlet 34 which is operatively connected to the lance tube of the soot blower in a conventional manner.

In the valve heating system, the connecting flange 14 is provided with an annular groove 35 communicating through a passage 37 with a substantially vertically extending discharge or condensing tube 38 which is connected to the flange 14 at 39 preferably by welding. Tube 38 extends down along the lagging and is slightly imbedded in the outside surface thereof to afford protection for the tube and minimize the possibility of bodily contact therewith. The lower end of tube 38 is curved to provide a condensate trap 40 which prevents the flow of steam upwardly through tube 38 and greatly increases the effectiveness of the heating system by insuring that all of the steam which flows into the tube and is condensed thereby flows first through groove 35. This increased effectiveness of tube 38 allows the tube to be made significantly shorter than would otherwise be necessary. The lower end of tube 38 is connected at 41, preferably by welding, to the branch line 11 and excess condensate in trap 40 drains into line 11. As alternative constructions, tube 38 may be connected into the steam main 10 or into a suitable receptacle or drain extrinsic to the steam supply system.

In the operation of the above described valve heating system, annular groove 35, passage 37, and condenser 38 establish a heating system through which steam from the line 11 flows after the main header 10 is energized with steam. This flow brings the steam into heating contact with the branch line flange 14 and into the valve inlet chamber 25 and around and into contact with substantial portions of body 19, flange 20, valve disc 26 and seat member 24 during the warmup period before the valve is opened. During this warmup period, tube 38 which is not insulated is therefore at a considerably lower temperature than the steam passing through line 11 and through passages 35 and 37. The steam in tube 38 is therefore condensed and the condensate runs down to the trap 40 where it is collected until it overflows out of the tube and into the steam lines where it can be re-evaporated by the supersaturated temperatures prevailing therein. Simultaneously with the warming up of the valve body and steam lines, the valve disc and seat member become heated very rapidly and the seat member tends to expand outwardly against the wall of the inlet cavity 25 of the body. This inner wall also becomes rapidly heated and tends to expand in the same direction as the seat member. Heretofore, however, the body flange 20 and the exterior portions of the body would tend to remain cool and resist expansion of the inner portions of the body. This resistance exerted severe compressive forces on the seat member tending to distort the same. Moreover, this diffrential heating of the body portions caused the body to warp and further exert compressive forces on the seat meber. These forces eventually resulted in permanent deformation of the seat member and often in cracking of the Stellite or other hard material face. With applicant's heating system, however, the steam flowing past the inside of flanges 14 and 20 and through passages 35 and 37 causes flanges 14 and 20 to heat up at a much faster rate and to a higher final temperature than heretofore attained. It is noted that the metal-to-metal engagement of the branch line and valve body flanges allows good heat transfer from the line flange to the body flange and other portions of the valve body. The resultant decrease in the resistance to natural expansion of the seat member therefore, and the decrease in warping of the valve body substantially decreases the seat member deformation and greatly lessens the possibility of its becoming permanently warped or its face becoming cracked. The life of the seat member is thereby greatly increased. It is also noted that the higher body temperatures thus obtained also reduce the warping effect of the second and much less significant thermal shock occurring when the blow valve is opened.

Another important consequence of using applicant's heating system is that the heating effect of the continuous flow of steam past portions of the steam lines and blow valves during the warmup period reduces the condensation which otherwise would occur when the blow valve is opened and thereby reduces the amount of water which is blown through the soot blower into the furnace. As aforesaid, during the warmup period, the large amounts of condensate formed in the lines are usually drained therefrom prior to opening of the blow valves.

While it will be apparent that the embodiment of the invention herein disclosed is well calculated to fulfill the objects of the invention, it will be appreciated that the invention is susceptible to modification, variation and change without departing from the proper scope or fair meaning of the subjoined claims.

What is claimed is:

1. A valve heating device for a casing having an inlet, an outlet and a valving element movable to open and closed positions to control fluid flow through said casing, said casing comprising body portions defining an inlet chamber communicating at all times with said inlet, said valving element having a portion exposed to the interior of said chamber, a steam supply conduit communicating with said inlet and chamber, a substantially exposed steam condensing conduit having an inlet in communication with condensate collecting means formed at the lower portion of said chamber and an outlet for said condensing conduit positioned below said condensing conduit inlet, said condensing conduit having a higher effective heat radiating capacity per unit cross sectional area than said supply conduit whereby steam condensed in said condensing conduit will flow by gravity through said condensing conduit outlet to create a pressure differential between said chamber and said steam supply conduit to cause a flow of steam through said chamber and past the valving element portion therein to provide heat to the body portions and valving element when the valving element is in closed position.

2. A device as defined in claim 1 wherein said collecting means comprises a trough-like channel extending entirely around the interior of said chamber.

3. A device as defined in claim 1 wherein the outlet for the condensing conduit comprises a condensate trap connected to said steam supply conduit upstream from the inlet of the condensing conduit.

4. A device as defined in claim 1 wherein said collecting means comprises a trough-like channel extending entirely around the interior of said chamber, and wherein the outlet for the condensing conduit comprises a condensate trap connected to said steam supply conduit upstream form the inlet of the condensing conduit.

References Cited by the Examiner
UNITED STATES PATENTS

| | | | |
|---|---|---|---|
| 386,670 | 7/88 | Waggoner | 236—66 |
| 491,112 | 2/93 | Hubbard | 236—66 |
| 499,463 | 6/93 | Lindsay | 236—62 |
| 614,099 | 11/98 | Griep | 137—171 |
| 1,934,829 | 11/33 | Snow | 122—392 |

ISADOR WEIL, *Primary Examiner.*

M. CARY NELSON, *Examiner.*